US007404331B2

(12) United States Patent
Ruud et al.

(10) Patent No.: US 7,404,331 B2
(45) Date of Patent: Jul. 29, 2008

(54) SENSOR ASSEMBLY, TRANSFORMERS AND METHODS OF MANUFACTURE

(75) Inventors: James Anthony Ruud, Delmar, NY (US); Emad Andarawis Andarawis, Ballston Lake, NY (US); Samhita Dasgupta, Niskayuna, NY (US); Minesh Ashok Shah, Clifton Park, NY (US); Mahadevan Balasubramaniam, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/528,236

(22) Filed: Sep. 27, 2006

(65) Prior Publication Data

US 2008/0072681 A1 Mar. 27, 2008

(51) Int. Cl.
*G01L 9/10* (2006.01)

(52) U.S. Cl. .............................. 73/722; 73/788; 73/735

(58) Field of Classification Search .................. 73/735, 73/728, 722; 300/20
See application file for complete search history.

(56) References Cited

U.S. PATENT DOCUMENTS 4,785,345 A * 11/1988 Rawls et al. ................ 257/531
4,816,784 A * 3/1989 Rabjohn ................... 333/24 R
7,196,607 B2 * 3/2007 Pleskach et al. ............. 336/200
2004/0158980 A1 8/2004 Nakatani et al.
2004/0265488 A1 12/2004 Hardwicke et al.
2005/0052268 A1 3/2005 Pleskach et al.
2005/0103112 A1 5/2005 Pedersen et al.
2005/0212642 A1 * 9/2005 Pleskach et al. ............. 336/200
2006/0006960 A1 1/2006 Lin et al.
2006/0066318 A1 3/2006 Andarawis et al.
2006/0103003 A1 5/2006 Heide et al.
2006/0125492 A1 6/2006 Andarawis et al.
2006/0132147 A1 6/2006 Balasubramaniam et al.

OTHER PUBLICATIONS

U.S. Appl. No. 11/115,736, filed Apr. 26, 2005.
U.S. Appl. No. 11/167,434, filed Jun. 6, 2005.
E. J. Brandon et al., "Printed Microinductors on Flexible Substrates for Power Applications," IEEE Transactions on Components and Packaging Technologies, vol. 26, No. 3, Sep. 2003, pp. 517-523.

* cited by examiner

*Primary Examiner*—Andre J Allen
(74) *Attorney, Agent, or Firm*—Penny A. Clarke; Patrick K. Patnode

(57) ABSTRACT

A sensor assembly is provided. The sensor assembly includes a sensor configured to measure an impedance value representative of a sensed parameter and a transformer coupled to the sensor. The transformer includes at least one ceramic substrate and at least one electrically conductive line disposed on the ceramic substrate to form at least one winding. The electrically conductive line includes an electrically conductive material.

24 Claims, 3 Drawing Sheets

SENSOR ASSEMBLY, TRANSFORMERS AND METHODS OF MANUFACTURE

BACKGROUND

The invention relates generally to sensors and, more particularly, to a sensor assembly that is configured to provide an accurate measurement of a sensed parameter in a high temperature environment.

Various types of sensors have been used to measure the distance between objects. In addition, such sensors have been used in various applications. For example, in turbine systems, the clearance between a static shroud and turbine blades is greatest when the turbine is cold, and gradually decreases as the turbine heats up and as it spins up to speed. It is desirable that a gap or clearance between the turbine blades and the shroud be maintained for safe and effective operation of the turbine. A sensor may be disposed within the turbine to measure the distance between the turbine blades and the shroud. The distance may be used to direct movement of the shroud to maintain the desired displacement between the shroud and the turbine blades.

In certain applications, capacitance probes are employed to measure the distance between two objects. Typically, when such capacitance probes are placed in high temperature environments, the signal processing unit is required to be located in an ambient environment at a distance from the probe. Further, the capacitance probe is connected to the signal processing unit with a cable. The cable adds an impedance component to the sensing circuit and such impedance component depends upon factors such as cable length, geometry and position. The variation in the properties of the cable may produce substantially large noise components in the signal thereby reducing the sensitivity and accuracy of the probes. The long cable itself acts as a means for electromagnetic noise to couple onto the cable reducing the fidelity of measured signal. In certain systems, electronic signal conditioning is employed to compensate for the signal losses due to such noise components. However, the electronic signal conditioning adds complexity and cost to the system design.

Accordingly, there is a need to provide a sensor that would provide a signal with substantially high signal-to-noise ratio at a remote signal processing unit. It would be also advantageous to provide sensor that provides an accurate measurement of a sensed parameter in high temperature environments.

BRIEF DESCRIPTION

Briefly, according to one embodiment, a sensor assembly is provided. The sensor assembly includes a sensor configured to measure an impedance value representative of a sensed parameter and a transformer coupled to the sensor. The transformer includes at least one ceramic substrate and at least one electrically conductive line disposed on the ceramic substrate to form at least one winding. The electrically conductive line comprises an electrically conductive material.

In another embodiment, an axial transformer is provided. The axial transformer includes a ceramic tube and at least one electrically conductive line deposited on the ceramic tube to form a number of windings.

In another embodiment, a planar transformer is provided. The planar transformer includes at least one low temperature co-fired ceramic (LTCC) planar substrate defining a number of vias at first, second and third locations on the LTCC planar substrate and a multi-loop planar coil disposed on the LTCC planar substrate.

In another embodiment, a method of manufacturing an axial transformer is provided. The method includes depositing at least one electrically conductive line on a ceramic cylinder to form a number of windings.

In another embodiment, a method of manufacturing a planar transformer is provided. The method includes providing at least one low temperature co-fired ceramic (LTCC) planar substrate, disposing a multi-loop planar coil on the LTCC planar substrate and co-firing the LTCC planar substrate and multi-loop planar coil.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a sensor that provides an accurate measurement of a sensed parameter in high temperature environments. In particular, the present invention provides a sensor that detects a value of a physical property from a value in impedance. For example, the sensor may be employed to measure a capacitance value between the sensor and an external object that is representative of clearance between the sensor and the external object in various systems such as a steam turbine, a generator, a turbine engine, a machine having rotating components, and so forth.

Figure 1:
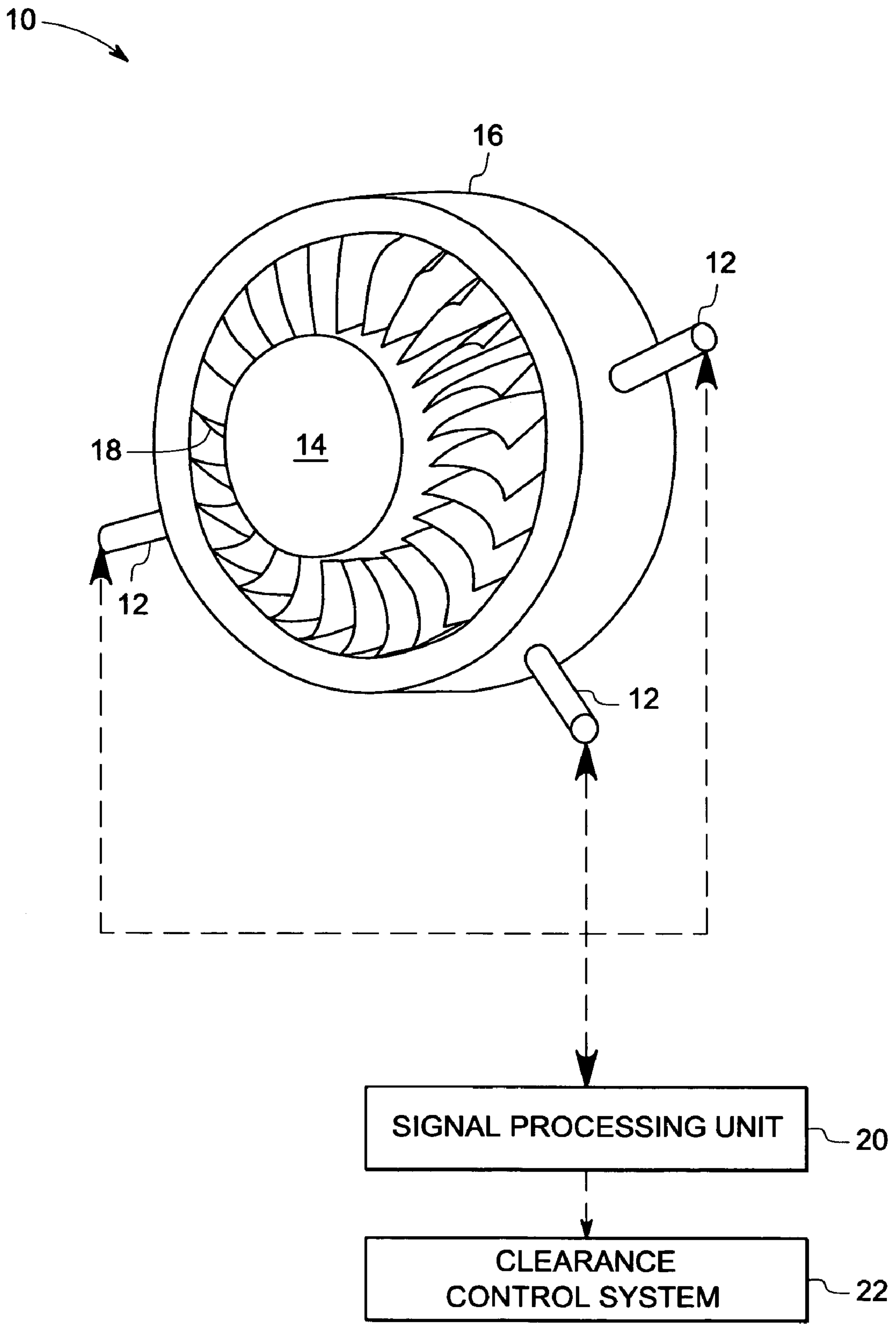
FIG. 1 is a diagrammatical illustration of a turbine of an engine having a sensor assembly in accordance with an exemplary embodiment of the present invention.

Referring now to the drawings, FIG. 1 illustrates a turbine 10 of an engine having a sensor assembly 12 in accordance with an exemplary embodiment of the present invention. The turbine 10 includes a rotor 14 disposed within a casing 16. Further, the rotor 14 includes a number of turbine blades 18 disposed within the casing 16. In this exemplary embodiment, a number of sensor assemblies 12 are disposed within the casing 16 for measuring the clearance between the casing 16 and the turbine blades 18. In this illustrated embodiment, three sensor assemblies 12 are employed at three different locations for clearance measurement between the casing 16 and the blades 18. However, a greater or lesser number of sensor assemblies may be used in other embodiments.

In the embodiment illustrated in FIG. 1, the sensor assembly 12 includes a capacitance sensor configured to measure a capacitance value between the sensor and the turbine blades 18, which is representative of the clearance between the casing 16 and the blades 18. Further, the sensor assembly includes a transformer coupled to the sensor for amplifying the value in capacitance to enhance the signal-to-noise ratio of the sensor. In the illustrated embodiment, a signal processing unit 20 is coupled to the sensor assembly 12 and is configured to estimate the clearance based upon the measured capacitance value from the sensor assembly 12. Further, the measurement through the sensor assembly 12 is used for controlling the clearance between the casing 16 and the turbine blades 18 via a clearance control system 22. Exemplary configurations of the sensor assembly 12 employed in the turbine 10 will be described in detail below with reference to FIGS. 2-5.

Figure 2:
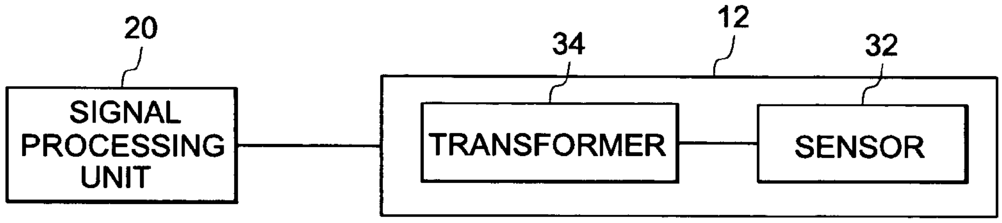
FIG. 2 is a diagrammatical illustration of the sensor assembly employed in the turbine of FIG. 1.

FIG. 2 is a diagrammatical illustration of the sensor assembly 12 such as employed in the turbine 10 of FIG. 1. As illustrated, the sensor assembly 12 includes a sensor 32 configured to measure an impedance value representative of a sensed parameter. In the illustrated embodiment, the sensor 32 includes a capacitance probe configured to measure a capacitance value between the sensor 32 and an external object such as blades 18 (see FIG. 1) and the capacitance value is representative of the clearance between the sensor 32 and the blades 18. In an exemplary embodiment, the sensor 32 includes a temperature sensor configured to measure a resistance value that is representative of a temperature of the sensor 32. In another exemplary embodiment, the sensor 32 includes a pressure sensor configured to measure a capacitance value of a cavity with a diaphragm and the capacitance value is representative of a pressure on the diaphragm.

Figure 3:
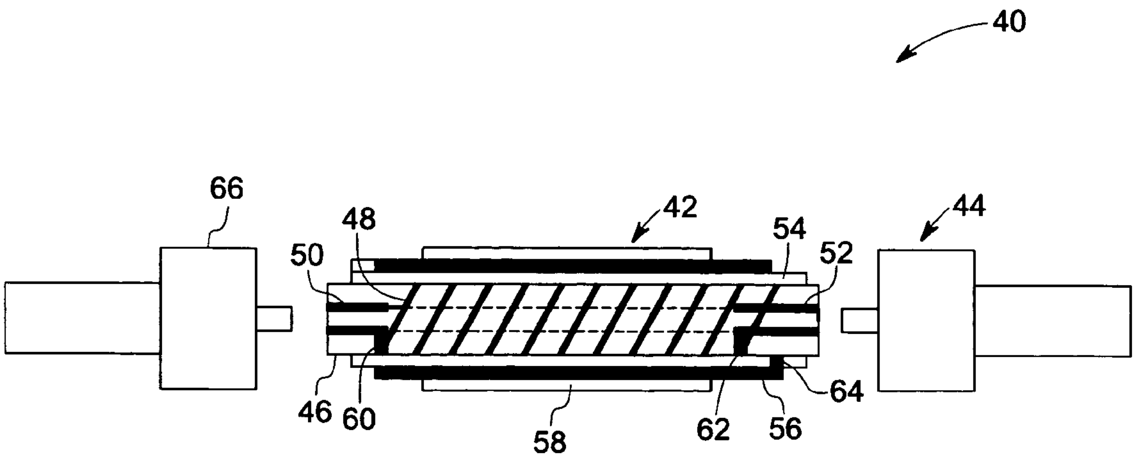
FIG. 3 is a diagrammatical illustration of an exemplary configuration of the sensor assembly of FIG. 2.
Figure 4:
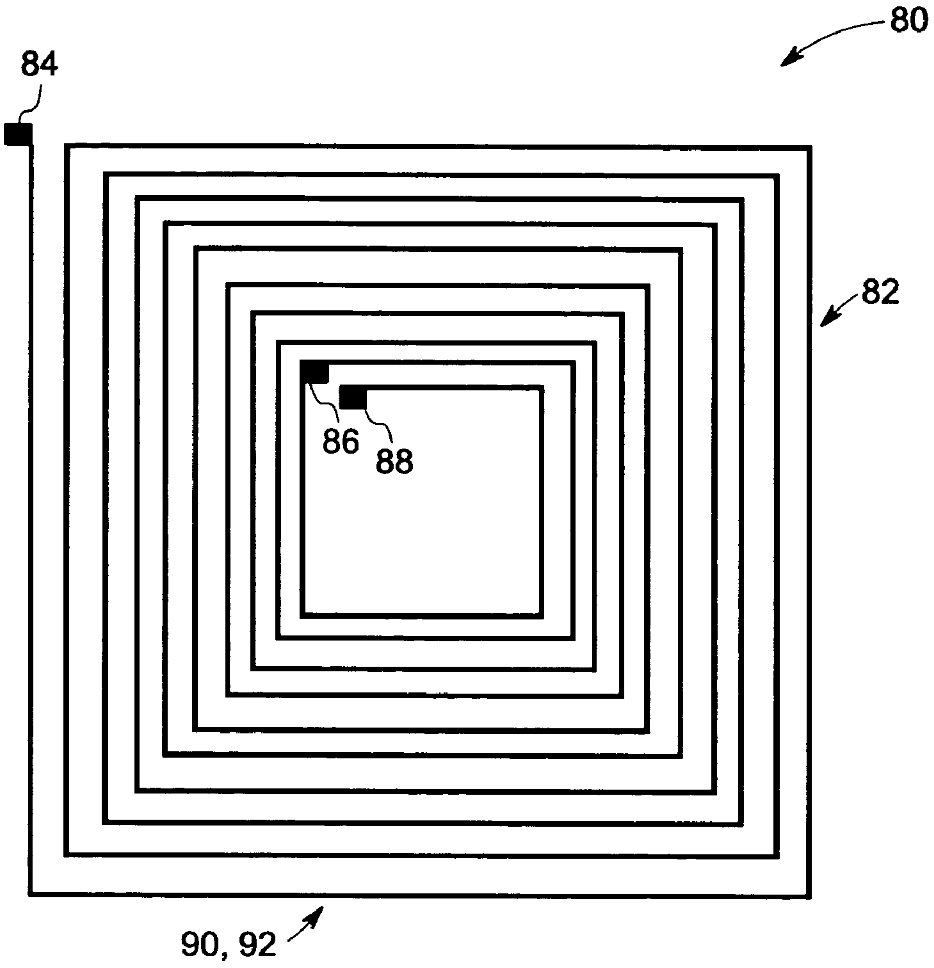
FIG. 4 is a diagrammatical illustration of an exemplary configuration of a planar autotransformer employed in the sensor assembly of FIG. 2.
Figure 5:
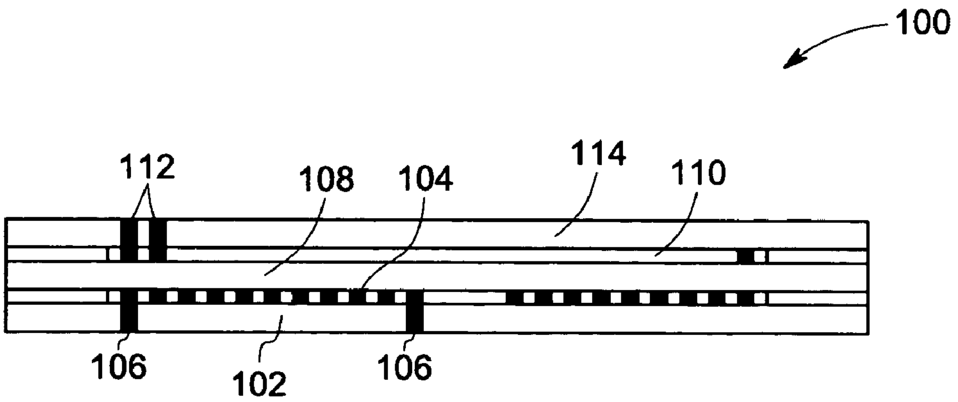
FIG. 5 is a diagrammatical illustration of another exemplary configuration of a planar transformer employed the sensor assembly of FIG. 2.

Further, the sensor assembly 12 includes a transformer 34 coupled to the sensor 32 for amplifying the measured value in impedance to enhance the signal-to-noise ratio of the sensor 32. In addition, the signal processing unit 20 is coupled to the sensor 32 and the transformer 34 for estimating the sensed parameter based upon the measured impedance value. In the illustrated embodiment, the transformer 34 includes at least one ceramic substrate and at least one electrically conductive line disposed on the ceramic substrate to form at least one winding. In one embodiment, the transformer 34 is an axial transformer. In another embodiment, the transformer 34 is a planar transformer. FIGS. 3-5 illustrate exemplary configurations of the axial and planar transformers employed in the sensor assembly 12.

FIG. 3 is a diagrammatical illustration of an exemplary configuration 40 of the sensor assembly 12 of FIG. 2. In the illustrated embodiment, the sensor assembly includes an axial transformer 42 coupled to a sensor 44. The axial transformer 42 includes a ceramic cylinder 46 and a number of electrically conductive lines 48 deposited on the ceramic cylinder 46 to form a number of windings. Exemplary materials for the ceramic tube 46 include alumina, or aluminosilicate, or borosilicate, or stabilized-zirconia, or combinations thereof. In the illustrated embodiment, the ceramic cylinder is a ceramic tube 46. However, in other embodiments the ceramic cylinder may take the form of a solid ceramic rod. In one embodiment, the ceramic tube 46 is pre-sintered to full density. Alternately, the ceramic tube 46 may be a green-body that is co-fired with the electrically conductive lines 48. In this exemplary embodiment, the electrically conductive lines 48 form ten windings. However, a greater or a lesser number of windings may be envisaged.

The electrically conductive lines 48 may be formed of a metal alloy including platinum, or palladium, or gold, or silver, or combinations thereof. In certain embodiments, the electrically conductive lines 48 are applied on the ceramic tube 46 by using a thick film ink through screen-printing, or stencil-printing, or fine line dispensing and then fired at an elevated temperature in a controlled atmosphere. In certain other embodiments, the electrically conductive lines 48 are applied through patterning and deposition techniques such as sputtering or evaporation. In particular examples, the width of the electrically conductive lines 48 is between about 0.075 mm and about 1 mm and the spacing between the electrically conductive lines 48 is between about 0.05 mm and about 5 mm.

For the illustrated embodiment, the transformer 42 includes first and second electrically conductive layers 50 and 52 disposed on an inner surface of the ceramic tube 46. In one exemplary embodiment, the first and second electrically conductive layers 50 and 52 are applied using a thin film ink of an organo-metallic precursor including platinum, or palladium, or gold, or silver, or combinations thereof. The resulting structure is fired. For the illustrated embodiment, the transformer 42 further includes a first insulation layer 54 covering the electrically conductive lines 48 and a third electrically conductive layer 56 disposed on the first insulation layer 54. Exemplary materials for the first and second insulation layers 54 and 56 include alumina, or aluminosilicate, or stabilized-zirconia, or magnesium oxide, or titania, or silicate, or combinations thereof. The first and second insulation layers 54 and 56 may be applied by sol-gel, colloidal suspensions or from polymeric precursors. The resulting structure is fired. Alternately, the first and second insulation layers 54 and 56 may be applied by sputtering or using a vapor deposition method, such as evaporation.

In certain embodiments, the first or second insulation layers 54 and 56 are formed of a glass, or a glass-ceramic such as a borosilicate or alumino-borosilicate glass. In operation, the glass layer may be applied through techniques such as dip-coating, screen printing, thick-film ink dispensing and so forth. Subsequently, the layer is fired at an elevated temperature. Further, the third electrically conductive layer 56 is formed of a metal alloy including platinum, or palladium, or gold, or silver, or combinations thereof. The third electrically conductive layer 56 may be applied by thick-film ink deposition, or thin film ink deposition, or vapor deposition, or combinations thereof.

A second insulation layer 58 is disposed on the third electrically conductive layer 56. In this exemplary embodiment, the first, second and third electrically conductive layers 50, 52 and 56 comprise metallization layers. The transformer 42 also includes a first metallic via 60 formed in the ceramic tube 46 for connecting the electrically conductive lines 48 to the first metallization layer 50, a second metallic via 62 formed in the ceramic tube 46 for connecting the electrically conductive lines 48 to the second metallization layer 52 and a third metallic via 64 extending through the first insulation layer 54 for connecting the electrically conductive lines 48 to the third metallization layer 56. In the illustrated embodiment, the first metallization layer 50 is provided to facilitate electrical contact with a signal line of a coaxial cable 66 of the signal processing unit 20 (see FIG. 2). Further, the second metallization layer 52 is configured to provide electrical contact to the sensor 44 and the third metallization layer 56 is configured to provide electrical contact to a number of shield lines (not shown) for the signal processing unit 20 and the sensor 44. In the illustrated embodiment, the first, second and third vias 60, 62 and 64 are filled with a thick film ink of a metal alloy including platinum, or palladium, or gold, or silver, or combinations thereof, which is subsequently fired.

As will be appreciated by one skilled in the art, the material and process parameters for forming the transformer 42 may be selected to ensure that the electrically conductive lines 48 remain continuous after processing and that dimensional tolerances are maintained. Further, dimensions of the transformer 42 may be selected to achieve a desired impedance gain. Instead of the above-described autotransformer configuration in which a single coil 48 is used and tapped at the 60 location to make a transformer, two separate coils can be used for the transformer. In an exemplary embodiment, the transformer 42 is an axial transformer having a number of electrically conductive lines 48 disposed on the ceramic tube 46 to form a first coil having a number of metallic windings and a second coil having a single metallic winding disposed on the insulation layer 54. Further, the first coil is electrically coupled to signal and shield lines of the signal processing unit 20 and the second coil is electrically coupled to signal and shield lines of the sensor 42. Thus, a number of configurations may be envisaged for the sensor assembly 40.

FIG. 4 is a diagrammatical illustration of an exemplary configuration 80 of a planar autotransformer employed in the sensor assembly 12 of FIG. 2. The planar transformer 80 includes at least one low temperature co-fired ceramic (LTCC) planar substrate 82 defining a number of vias such as represented by reference numerals 84, 86 and 88 disposed at first, second and third locations on the LTCC planar substrate 82. The planar transformer 80 also includes a multi-loop planar coil 90 disposed on the LTCC planar substrate 82. In this exemplary embodiment, the multi-loop planar coil 90 is a ten-loop planar coil that is fabricated by screen printing Dupont™ 6142D Ag Cofireable conductor thick film paste onto a Dupont™ 951Green Tape™. Both the Dupont™ 6142D Ag Cofireable conductor thick film paste and the Dupont™ 951 Green Tape™ are commercially available materials sold by E. I. du Pont de Nemours and Company, Richmond, Va.

In the illustrated embodiment, a second layer 92 of Dupont™ 951Green Tape™ is laminated on the top of the multi-loop planar coil 90 with holes provided at the first, second and third locations for defining the vias 84, 86 and 88. In this embodiment, the vias 84, 86 and 88 are filled with Dupont™ 6142D Ag Cofireable conductor. Further, the coil 90 is co-fired at a temperature up to about 850° C. In addition, connection terminals (not shown) are provided from vias 84, 86 and 88 to a signal line of the signal processing unit 20 (see FIG. 2), a signal line of the sensor 32 (see FIG. 2) and shield lines of the signal processing unit 20 and the sensor 32 respectively. In certain embodiments, the planar transformer 80 includes a number of LTCC planar substrates, where the multi-loop planar coil is disposed on a first one of the LTCC planar substrates as described below with reference to FIG. 5.

FIG. 5 is a diagrammatical illustration of another exemplary configuration 100 of a planar transformer employed the sensor assembly 12 of FIG. 2. The planar transformer 100 includes a first LTCC planar substrate 102. A multi-loop planar coil 104 is disposed on the first LTCC planar substrate 102. In this exemplary embodiment, the multi-loop planar coil 104 is a ten-loop planar coil. Further, vias 106 are provided through the first LTCC planar substrate 102 for facilitating connections from the signal cable of the signal processing unit 20 (see FIG. 2) to both ends of the multi-loop planar coil 104. In addition, the planar transformer 100 includes a second LTCC substrate (intermediate layer) 108 laminated on the top of the multi-loop planar coil 104. A second coil 110 having a single metallic winding is disposed on the second LTCC substrate 108. An upper LTCC substrate (upper layer) 114 may be disposed over the second coil 110. Further, vias 112 are provided through the upper LTCC substrate 114 for providing connections from the sensor 32 (see FIG. 2) to both ends of the coil 110. Subsequently, the unit is co-fired at a temperature of up to about 850° C.

The various aspects of the method described hereinabove have utility in applications where measurements of a sensed parameter in a high temperature environment are desired. In certain embodiments, the sensor assembly described above may be employed for measurements of parameters in temperatures upto about 850° C. For example, the technique described above may be used for measuring the clearance between a rotating component and a stationary component in an aircraft engine. As noted above, the technique provides a sensor that would provide a signal with substantially high signal-to-noise ratio at a remote signal processing unit by amplifying a change in impedance thereby enhancing the sensitivity and accuracy of the sensor.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sensor assembly comprising:

a sensor configured to measure an impedance value representative of a sensed parameter; and a transformer coupled to the sensor, wherein the transformer comprises at least one ceramic substrate and at least one electrically conductive line disposed on the ceramic substrate to form at least one winding, wherein the electrically conductive line comprises an electrically conductive material.

2. The sensor assembly of claim 1, wherein the sensor comprises a capacitance probe configured to measure a capacitance value between the sensor and an external object and wherein the capacitance value is representative of a clearance between the sensor and the external object.

3. The sensor assembly of claim 1, wherein the sensor comprises a temperature sensor configured to measure a resistance value and wherein the resistance value is representative of a temperature of the sensor.

4. The sensor assembly of claim 1, wherein the sensor comprises a pressure sensor configured to measure a capacitance value of a cavity with a diaphragm and wherein the capacitance value is representative of a pressure on the diaphragm.

5. The sensor assembly of claim 1, further comprising a signal processing unit coupled to the sensor and the transformer and configured to estimate the sensed parameter based upon the measured impedance value.

6. The sensor assembly of claim 1, wherein the transformer comprises an axial transformer, wherein the ceramic substrate comprises a ceramic tube, and wherein the at least one electrically conductive line is disposed on the ceramic tube to form the at least one winding of the transformer.

7. The sensor assembly of claim 6, further comprising a signal processing unit coupled to the sensor and the axial transformer and configured to estimate the sensed parameter based upon the measured impedance value, wherein the axial transformer further comprises:

a first electrically conductive layer for providing electrical contact to a signal line for the signal processing unit;

a second electrically conductive layer for providing electrical contact to the sensor;

a first insulation layer covering the at least one electrically conductive line;

a third electrically conductive layer for providing electrical contact to a plurality of shield lines for the signal processing unit and the sensor, wherein the third electrically conductive layer is disposed on the first insulation layer; and a second insulation layer disposed on the third electrically conductive layer.

8. The sensor assembly of claim 7, wherein the first, second and third electrically conductive layers comprise metallization layers, wherein the first and second metallization layers are disposed on an inner surface of the ceramic tube, and wherein the axial transformer further comprises:

a first metallic via formed in the ceramic tube for connecting the at least one electrically conductive line to the first metallization layer;

a second metallic via formed in the ceramic tube for connecting the at least one electrically conductive line to the second metallization layer; and a third metallic via extending though the first insulation layer for connecting the at least one electrically conductive line to the third metallization layer.

9. The sensor assembly of claim 6, further comprising a signal processing unit coupled to the sensor and the axial transformer and configured to estimate the sensed parameter based upon the measured impedance value, wherein the axial transformer comprises a plurality of electrically conductive lines disposed on the ceramic tube to form a first coil having a plurality of metallic windings disposed on the ceramic tube and a second coil having a single metallic winding disposed on the ceramic tube, wherein the first coil is electrically coupled to signal and shield lines of the signal processing unit and wherein the second coil is electrically coupled to signal and shield lines of the sensor.

10. The sensor assembly of claim 1, wherein the transformer comprises a planar transformer, wherein the ceramic substrate comprises a low temperature co-fired ceramic (LTCC) planar substrate defining a plurality of vias for connecting to the planar coil, and wherein the electrically conductive line forms a planar coil disposed on the LTCC planar substrate.

11. The sensor assembly of claim 10, wherein the vias are filled with an electrically conductive material, the sensor assembly further comprising:

a signal processing unit coupled to the sensor and the transformer and configured to estimate the sensed parameter based upon the measured impedance value; and a plurality of connection terminals for connecting the vias to signal and shield lines of the signal processing unit and the sensor.

12. The sensor assembly of claim 10, further comprising a signal processing unit coupled to the sensor and the transformer and configured to estimate the sensed parameter based upon the measured impedance value, wherein the planar transformer comprises a plurality of LTCC substrates and plurality of electrically conductive lines, wherein one of the electrically conductive lines forms a first coil having a plurality of metallic windings disposed on a first one of the LTCC substrates, wherein another of the electrically conductive lines forms a second coil having a single metallic winding disposed on a second LTCC substrate and wherein the first coil is electrically coupled to the signal processing unit and the second coil is electrically coupled to the sensor.

13. An axial transformer comprising:

a ceramic tube;

at least one electrically conductive line deposited on the ceramic tube to form a plurality of windings;

a first electrically conductive layer disposed on an inner surface of the ceramic tube; and a second electrically conductive layer disposed on the inner surface of the ceramic tube.

14. The axial transformer of claim 13, further comprising:

a first insulation layer covering the at least one electrically conductive line;

a third electrically conductive layer disposed on the first insulation layer; and a second insulation layer disposed on the third electrically conductive layer.

15. The axial transformer of claim 13, further comprising:

a first metallic via formed in the ceramic tube for connecting the at least one electrically conductive line to the first electrically conductive layer;

a second metallic via formed in the ceramic tube for connecting the at least one electrically conductive line to the second electrically conductive layer; and a third metallic via extending through the first insulation layer for connecting the at least one electrically conductive line to the third electrically conductive layer.

16. The axial transformer of claim 13, wherein the first, second and third electrically conductive layers comprise platinum, or palladium, or gold, or silver, or combinations thereof.

17. The axial transformer of claim 13, wherein the first and second insulating layers comprise alumina, stabilized-zirconia, aluminosilicate, magnesium oxide, titania, silica, borosilicate, alumino-borosilicate glass, or combinations thereof.

18. The axial transformer of claim 13, wherein the ceramic tube comprises alumina, or aluminosilicate, or borosilicate, or stabilized-zirconia, or combinations thereof.

19. The axial transformer of claim 13, wherein the electrically conductive lines comprise a metal alloy and wherein a width of the electrically conductive lines is between about 0.075 mm to about 1 mm and a spacing between the electrically conductive lines is between about 0.05 mm to about 5 mm.

20. The axial transformer of claim 13, wherein the axial transformer comprises a plurality of electrically conductive lines disposed on the ceramic tube to form a first coil having a plurality of metallic windings disposed on the ceramic tube and a second coil having a single metallic winding disposed on the ceramic tube.

21. A method of manufacturing an axial transformer, comprising:

depositing at least one electrically conductive line on a ceramic tube to form a plurality of windings;

disposing a first electrically conductive layer on an inner surface of the ceramic tube; and disposing a second electrically conductive layer on the inner surface of the ceramic tube.

22. The method of claim 21, wherein depositing the at least one electrically conductive line comprises depositing a thick film ink by screen-printing, or stencil printing, or fine line dispensing, or patterning, or sputtering, or combinations thereof.

23. The method of claim 21, further comprising:

providing a first insulation layer covering the at least one electrically conductive line;

disposing a third electrically conductive layer on the first insulation layer; and disposing a second insulation layer on the third electrically conductive layer.

24. The method of claim 23, wherein disposing the first and second electrically conductive layers comprises applying a thin film ink of an organo-metallic precursor, and wherein disposing the third electrically conductive layer comprises applying a metallization layer though thick film ink deposition, or thin film ink deposition, or vapor deposition, or combinations thereof.

* * * * *

UNITED STATES PATENT AND TRADEMARK OFFICE

CERTIFICATE OF CORRECTION

PATENT NO. : 7,404,331 B2
APPLICATION NO. : 11/528236
DATED : July 29, 2008
INVENTOR(S) : James Anthony Ruud et al.

It is certified that error appears in the above-identified patent and that said Letters Patent is hereby corrected as shown below:

In Column 7, Line 10, in Claim 8, delete "though" and insert -- through --, therefor.

In Column 8, Line 62, in Claim 24, delete "though" and insert -- through --, therefor.

Signed and Sealed this

Nineteenth Day of May, 2009

JOHN DOLL
*Acting Director of the United States Patent and Trademark Office*